United States Patent [19]

Hodgdon

[11] 4,191,811

[45] Mar. 4, 1980

[54] ION EXCHANGE MEMBRANES BASED UPON POLYPHENYLENE SULFIDE AND FLUOROCARBON POLYMERIC BINDER

[75] Inventor: Russell B. Hodgdon, Sudbury, Mass.

[73] Assignee: Ionics, Incorporated, Watertown, Mass.

[21] Appl. No.: 931,640

[22] Filed: Aug. 7, 1978

Related U.S. Application Data

[62] Division of Ser. No. 773,371, Mar. 1, 1977, Pat. No. 4,110,265.

[51] Int. Cl.$^2$ .......................... B01D 13/04; C08J 5/22
[52] U.S. Cl. .......................................... 521/27; 521/28
[58] Field of Search ................... 521/27, 28; 260/900, 260/30.6 R, 32.4, 32.6 R; 54/30

[56] References Cited

U.S. PATENT DOCUMENTS

| | | | |
|---|---|---|---|
| 3,528,858 | 9/1970 | Hodgdon, Jr. et al. | 521/27 |
| 3,855,122 | 12/1974 | Bourgonel | 521/27 |
| 3,993,843 | 11/1976 | Vasta | 260/900 |
| 4,008,203 | 2/1977 | Jones | 260/32.6 R |
| 4,026,863 | 5/1977 | Iseki et al. | 260/900 |
| 4,090,993 | 5/1978 | Attwood et al. | 260/900 |

*Primary Examiner*—Joseph L. Schofer
*Assistant Examiner*—Peter F. Kulkosky
*Attorney, Agent, or Firm*—Norman E. Saliba

[57] ABSTRACT

The invention related to a heterogeneous cation exchange membrane comprised of particles of sulfonated polyphenylene sulfide polyelectrolyte in a fluorocarbon polymeric binder and to the method of making the same.

8 Claims, No Drawings

ION EXCHANGE MEMBRANES BASED UPON POLYPHENYLENE SULFIDE AND FLUOROCARBON POLYMERIC BINDER

CROSS REFERENCE TO RELATED APPLICATION

This application is a division of applicant's prior copending application, Ser. No. 773,371 filed Mar. 1, 1977 now U.S. Pat. No. 4,110,265.

This invention is directed to ion-selective membranes comprising an increased oxidation resistant polyelectrolyte bound permanently by a perfluorocarbon binder which is oxidation resistant. In the definition of oxidation resistant, we specifically define increased resistance to oxidation by the hypochloride ion (OCl) or by hypochlorous acid (HClO). Specifically, this invention is directed toward the preparation and use of a novel, inexpensive non-fluorine containing polyelectrolyte which can be used in a membrane form in the presence of bleach (hypochlorite) solutions.

The preparation of bleach, or hypochlorite solutions in situ by an electrochemical cell, (the bleach so produced employed for the purpose of removing waste from rivers and streams as well as for the manufacture of certain decolored articles of commerce such as paper, cloth etc.) has recently become feasible by the anodic oxidation of brine using a membrane separator to form compartments of an electrochemical cell. Such a device has been made practical by the advent of a fluorocarbon based cation exchange membrane which serves as a barrier to separate the anode and cathode compartments of the electrochemical cell. Such polymers and membranes are fully disclosed in U.S. Pat. Nos. 3,282,875, 3,560,568, 3,718,627, 3,909,378 and others. The use of such membranes in caustic-chlorine electrolytic cells is disclosed in U.S. Pat. Nos. 3,773,624, 3,925,174, 3,948,737, 3,954,579, 3,976,549, 3,985,631 and others.

During this electrochemical process, sodium ions must be passed through a hypochlorite resistant cation exchange membrane, so as to balance electro-neutrality. While cation membranes having entirely carbon, fluorine or sulfonate bonding structurs have been prepared and used for this new electrochemical process as noted hereinabove, their cost has been extremely high. This present invention is directed to the preparation of a cation exchange membrane based upon a new and inexpensive carbon, hydrogen, sulfur bonded system which is capable of being fabricated into a sodium conduction cation exchange membrane and which is capable of resisting to an increased degree the action of the hypochlorite ion or hypochlorous acid molecule over substantial periods of time. Conventional, inexpensive cation exchange membranes common to the chemical markets are soon oxidized to useless masses of oxidation products under similar conditions.

Historically, polyelectrolytes are prepared from organic polymers having aliphatic backbone structures with appending aromatic structures. It is the appending aromatic structures of such polymers which are chemically reacted to form the ionizing groups. The alkyl backbone groups of the polymers are very susceptible to oxidative degradation not only by bleach (hypochlorite) solutions but also by oxygen and sunlight.

While backbone polymerizates having perfluoroalkyl groups have been found to be resistant to hypochlorite and other potent oxidative reactions, they have been synthetically difficult to prepare and as a result very expensive and restrictive in terms of a tailor-made varieties. All such polyelectrolytes however, have been of the perfluorocarbon type.

Many unsuccessful attempts have been directed at the syntheses of oxidation stable polyelectrolytes having totally non-aliphatic polymeric backbone structures. One such example is the iogenated polyphenylene oxides which were bound to be prone to oxidation due to the existence of alkyl side chains and phenolic groups. Another example is the iogenated polysulfones which were also found to be prone to degradation due to oxidation of the single isopropylidene group in the polymer backbone.

Because of many repeated failures in the preparation of an oxidatively resistant polyelectrolyte structure (except the synthetically difficult and highly expensive perfluoralkyl-aryl polyelectrolytes) it has become an objective to prepare a cation exchange membrane polyelectrolyte system based upon hydro-carbon stable chemical structures which possess increased oxidation stability.

It has now been found that a new type of polymer, polyphenylene sulfide (PPS), has such an oxidation resistant property and is capable of being converted into crosslinked (insoluble-infusible) sulfonate salts which can in turn be fabricated into perselective membranes capable of exposure to the hypochlorite ion with improved resistance to polymeric degradation. This basic starting material of polyphenylene sulfide polymer can be heated up to 412° C. in air before the onset of degradation and will react only in strong oxidizing agents.

Polyphenylene sulfide was found to react with at least 10% oleum (10% by weight of sulfur trioxide ($SO_3$) in concentrated sulfuric adid) to undergo a set of reactions forming the polyelectrolyte and free sulfur dioxide ($SO_2$).

As noted in equation (1) below, the integer n is of significant magnitude to provide a polymer having a molecular weight sufficient to form a solid material. The integer m is only slightly smaller than that of n.

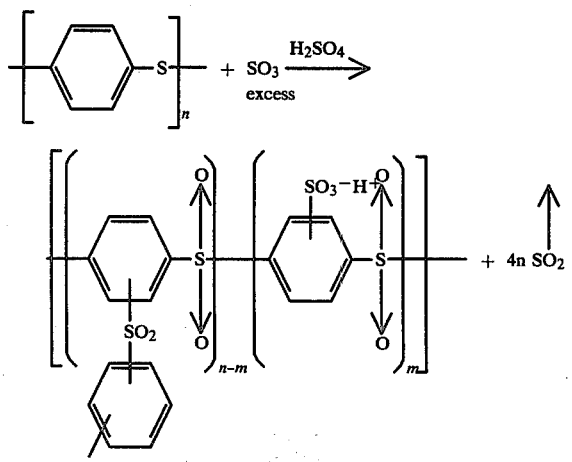

The sulfonation of polyphenylene sulfide can essentially be effected only with 10% to 65% by weight of $SO_3$ oleum due to the initial formation of polyphenylene sulfone.

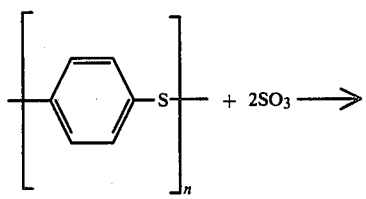

The subsequent sulfonation of the resulting polysulfone becomes difficult because of the ring electron withdrawing power to the sulfone

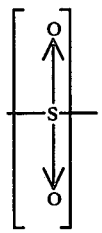

group. In practice we find that pure concentrated sulfuric acid, chlorosulfonic acid or oleum containing mush less than 10% by weight of $SO_3$ content fails to effect sulfonation of the polysulfone. Sulfonation, although more difficult with oleum concentrations much greater than 15% by weight of $SO_3$ is effected in a preferred time of 17 to 30 hours and a preferred temperature range of 25° C. to 60° C. Oleum is sometimes called fuming sulfuric acid.

In general, sulfonation takes place in one of three to four phenyl rings with crosslinking occurring by sulfone linkages between polymeric chains.

Upon completion of this sulfonation, we obtain a crosslinked, insoluble, and infusible network polymer having the aryl rings highly deficient in electrons due to massive sulfone and sulfonic acid substitutions (i.e. they serve to draw ring electrons into their molecular structures). Such compounds, unlike sulfonated aryl or arylalkyl hydrocarbons such as sulfonated p-polyphenyl or sulfonated polystyrene, are very resistant to oxidizing reagents. This resistance to oxidizing agents makes this invention valued as a cation exchanger which can be used in aggressive oxidizing media.

The starting thermoplastic polyphenylene sulfide resin is a crystalline aromatic polymer having a rigid backbone chain formed by joining at the para position, a series of benzene rings with sulfur atoms to produce a water swellable, insoluble polymer having increased resistance to oxidation. As noted in Equation (1) large quantities of sulfur dioxide gas are evolved indicating oxidation of the polyphenylene sulfide at the sulfur atom by the $SO_3$ oxidant in concentrated acid solution. The sulfonated polymerizate formed is then converted to the sodium salt form by equilibration in sodium chloride solution. The final product was found to have improved resistance to oxidation by testing in 5% calcium hypochlorite over a 43-day period.

This latter test is significant since the original starting material of the polyphenylene sulfide polymer is listed as being readily oxidizable by a solution of strong sodium hypochlorite. The important and unexpected finding is that the polymer of the present invention undergoes a reduced amount of oxidation by strong hypochlorite or bleach solution once it has undergone non-scissionary oxidation by sulfur trioxide.

The resulting crosslinked and sulfonated polyelectrolyte is then very finely divided in a ball mill and admixed with given portions of polyvinylidene fluoride dissolved in a volatile solvent such as a methyl ethyl ketone-dimethylformamide mixture to form a homogeneous membrane casting batter. This batter is an excellent film former whole drying from its solvents and makes useful cation exchange membranes of the heterogeneous type. Membrane films may be cast either unbacked (unsupported) or dip noted onto any cloth matrix desired.

The viscosity of the batter which is dependent on solids content may be varied so as to give any desired membrane thickness employing direct casting or any desired coating thickness via the cloth dip coating procedure.

The blending of the dried, finely ground sulfonated polyphenylene sulfide (which is recovered from the oleum reaction vessel) with a fixed ion exchange capacity range of between 0.22 and 4:10 milliquivalents of exchangeable group per gram of dried polyelectrolyte powder has been found to give a membrane having all components bound into a film-like shape. The sulfonated polyelectrolyte which is substantially insoluble and infusible will (because of the great number of sulfonic acid groups introduced during its preparation) osmotically imbibe water upon immersion in same to form a soft jelly-like mass having little handling strength. The excellent film former polyvinylidene fluoride is employed to bind in a matrix form, the polyelectrolyte particles into a useful membrane structure. The use of 10 to 70% by weight of sulfonated polyphenylene sulfide in polyvinylidene fluoride (Kynar ® Gd 201-Penwalt Corp.) is a useful ratio to prepare structurally sound membrane composites although the range between 40–60% is preferred. This does not imply that other percentages or ratios of the sulfonated polymer in the film former cannot be used successfully as a result of this invention. Further, other binders or membrane film formers besides polyvinylidene fluoride may also be used with this new oxidation resistant polyelectrolyte. These would include polyvinyl chloride, polyvinylidene chloride, polyvinylidene fluoride, polymethyl methacrylate, polystryene, polystyrene-butadiene copolymer, copolymers of vinylidene fluoride and chlorotrifluoroethylene, polyvinyl fluoride, polyphenylene oxide polysulfone, polyoxymethylene, copolymers of vinyl chloride and acrylonitrile and other common polymeric film forming binders. Further, the molecular weight grade of the basic polyphenylene sulfide is not specified and restrictive in the practice of this invention. Any polyphenylene sulfide may be employed having a molecular weight sufficiently high enough to give (on reaction with strong oleum) insolubility to the resulting polyelectrolyte in know solvent, at room temperature. The molecular weight employed should yield a polymer capable of resisting degradation in air up to 412° C.

and should be able to be used in a reaction with at least 10% by weight of $SO_3$ in $H_2SO_4$ to yield the polyelectrolyte of this invention.

Having described the invention in general terms, the following examples will more particularly illustrate the same.

PREPARATION OF THE SULFONATED AND OXIDIZED POLYELECTROLYTE FROM POLYPHENYLENE SULFIDE

EXAMPLE I

Three (3) grams of polyphenylene sulfide (RYTON-V1, Phillips Petroleum Co.) were added with stirring into 20 ml. of 10% oleum (10% by weight of $SO_3$ is concentrated $H_2SO_4$) contained in a 150 ml. Ehrlenmeyer flask. An immediate color change was noted as the stirred paste changed from a light tan color to deep emerald green. The green paste was stirred for 15 minutes and immediately poured into 200 ml. of distilled water. The green color disappeared, yielding once again a light tan precipitate. This precipitate was filtered and washed free of sulfuric acid, dried at 105° C., and tested for sulfuric acid substitution. The ion exchange capacity was found to equal 0.22 milliequivalents of exchangeable cation per gram of dry resin.

EXAMPLE II

Three (3) grams of the polyphenylene sulfide were added with stirring into 20 ml of 10% by weight of oleum in a 150 ml Ehrlenmeyer flask. An immediate color change was again noted as the stirred paste changed from a light tan coloration to deep emerald green. The green paste was allowed to sit overnight for 17 hours. At the end of this period a emerald green voluminous jelly, occupied a major volume of the flask and the odor of residual sulfur dioxide gas was pronounced. This product in the form of a firm gel was removed from the reaction vessel and placed into 200 ml of distilled water. The green color changed to one of a dark brown gelatinous mass with much evolution of heat. The resulting jelly was filtered and washed free of residual sulfuric acid whence a brown gelatinous mass remained. This mass which had osmotically combined with large quantities of water, was placed in an oven overnight whence a small volume of dark brown powder was obtained. This dry powder was finely ground for six hours in a ball mill, was brown in color, and had an ion exchange capacity (I.E.C.) of 2.0 milliequivalents exchangeable cation/dry gram resin.

EXAMPLE III

Three (3) grams of polyphenylene sulfide were added with stirring into 20 ml of 15% oleum (15% by weight of $SO_3$ in $H_2SO_4$) in a 150 ml Ehrlenmeyer flask with stirring and the paste which developed was treated as in Example II above. The resulting brown powder had an ion exchange capacity of 3.13 milliequivalents exchangeable cation/dry gram of resin.

EXAMPLE IV

The same quantities of reactants were combined as in Example III but with the following changes in reaction conditions:
(a) The time of reaction was 30 minutes instead of 17 hours
(b) The reactants were heated to 65° C. during the reaction time and held at this temperature.

Again, copious quantities of sulfur dioxide were released during the reaction period. However, the final product was a smooth liquid green paste rather than the gelatinous mass.

On adding the green paste to 200 ml. of distilled water, a tan gelatinous material resulted which was insoluble in water, methyl alcohol, methylethyl ketone, diethyl benzene, chloroform, or cyclohexanone. The jelly was filtered and washed free of residual sulfuric acid whence a brown gelatinous mass remained. This mass which had osmotically combined with large quantities of water, was placed in an oven overnight whence a small volume of brown powder was obtained. This powder when finely ground was brown in color and had an ion exchange capacity of 1.32 meq/dgr resin.

EXAMPLE V

Twenty (20) grams of polyphenylene sulfide were added with stirring into fifty (50) ml. of 15% by weight of $SO_3$ oleum in a 250 ml, Ehrlenmeyer flask. An immediate color change was noted as the stirred paste changed from a light tan color to dark greenish black. At the end of an overnight period, a voluminous black jelly was noted and the odor of residual sulfur dioxide was pronounced. The gel was placed into 500 ml. of tap water and the black color slowly disappeared with the evolution of much heat, to form a deep brown jellied mass in the aqueous phase. The jelly was filtered and washed free of residual sulfuric acid whence a brown gelatinous mass remained. After drying and grinding the resulting powder which was brown in color and had a cation exchange capacity of 4.10 meq/drg.

PREPARATION OF HETEROGENEOUS CATION EXCHANGE MEMBRANE FROM POLYELECTROLYTE AND POLYVINYLIDENE FLUORIDE

EXAMPLE IV

One gram of polyvinylidene fluoride (Kynar®, Grade 201 Penwalt Corp.) and one gram of the polyelectrolyte prepared in Example II were admixed in a mortar and pestel in the presence of excess acetone. The mixture was heated to 41° C. into a thick brown paste which was cast onto a sheet of glass using a film casting bar. Upon evaporation of the acetone, a film remained which was lifted from the glass plate and placed into a pan of distilled water. The strength of the film remained good and was easily handled when removed from the aqueous phase. The resulting water imbibed film was first soaked in 2 N sodium chloride (NaCl), rinsed free of excess salt, and finally equilibrated in 0.01 N sodium chloride solution.

Thickness of film=0.009 cm;
Resistance (measured)=60 ohms (0.123 cm$^2$ area);
Resitivity (calculated)=7.4 ohm/cm$^2$.

EXAMPLE VII

The same procedure was carried out as in Example VI except that two grams of polyvinylidene fluoride was mixed with one gram of the polyelectrolyte. The cast film resulting was much thicker upon evaporation of the acetone solvent as noted below.

Thickness=0.020 cm;
Resistance (measured)=120 ohms;
Resitivity (calculated)=14.8 ohm/cm$^2$.

EXAMPLE VIII 1.5 grams of the polyelectrolyte from Example II and 1.5 grams of polyvinylidene fluoride were admixed and combined with 20 ml of 7:1 by volume of methyl ethyl ketone: dimethylformamide. The mixture was heated to 55° C. whence a smooth yellow bown batter (or paste) was obtained. This batter was spread on a glass plate with a 3 ml thick polyester (Mylar ®) film. A casting bar was used to spread the paste into a thin membrane film. The film was allowed to dry overnight with a glass cover spaced ¼" away from the spread paste so as to allow the solvents to slowly evaporate. The resulting dried film was easily removed, was brown in color, and was immediately immersed in water. The film remained strong upon wetting and after extensive leaching, was tested for resistance properties is distilled water.

Thickness=0.059 cm;
Resistance measured (distilled water; 1000 Hz) =39 ohms (H+form);
Resitivity (calculated)=4.8 ohm/cm$^2$ (H$^{30}$ form).

This membrane was then equilibrated in 2 N NaCl, washed free of salt, and its properties again measured.

Thickness=0.058 cm;
Resistance (measured) (0.01 N NaCl; 1000 Hz) =95 ohms (Na$^{30}$ form);
Resistivity (calculated)=11.7 ohm/cm$^2$;
Ion Exchange Capacity=1.10 meq/drg;
Water Content (% wet basis)=60.0%.

PREPARATION OF HETEROGENEOUS CLOTH BACKED CATION EXCHANGE MEMBRANES FROM POLYELECTROLYTE, POLYVINYLIDENE FLUORIDE, AND A COPOLYMER OF VINYLIDENE FLUORIDE-CHLOROTRIFLUOROETHYLENE (KEL-F ® 3700)

EXAMPLE IX

One gram of the polyelectrolyte described in Example II was admixed in a mixture of fluorocarbon polymers dissolved in methyl ethyl ketone at 50° C. The fluorocarbon polymer mixture consisted of 1.6 grams polyvinylidene fluoride, 0.4 grams Kel-F ® 3700 (3M Company), and 20 ml methyl ethyl ketone. After thoroughly mixing with a spatula, the strips of 4"×½" pieces of polypropylene and Dacron ® polyester cloth were soaked in the batter, pulled from the batter, drip-dried, and then oven dried at 105° C. Satisfactory cloth backed membranes were obtained having a rubbery feeling due primarily to the Kel-F ®.

The dried membrane samples, on their respective cloth backings were soaked in 2 N NaCl for two hours and leached free of salt during an overnight soaking. All films were found to be leak-tight to a methylene blue dyetest and each had the following properties:

(a) Polypropylene Backed Membrane

Thickness=0.092 cm;
Measured Resistance (0.01 N NaCl, 1000 Hz)=400 ohms;
Calculated Resistivity=49.2 ohm/cm$^2$.

(b) Dacron ® Backed Membrane

Thickness=0.042 cm;
Measured Resistance (0.01 N NaCl, 1000 Hz)=290 ohms;
Calculated Resistivity=35.7 ohm/cm$^2$.

Each sample was equilibrated in 0.6 N KCl for 2 hours and the resistivity re-evaluated.

(a) Polypropylene Backed Membrane

Thickness=0.090 cm;
Measured Resistance (0.6 N Kcl; 1000 Hz)=80 ohms;
Caculated Resistivity=9.8 ohm/cm$^2$.

(b) Dacron ® Backed Membrane

Thickness=0.042 cm;
Measured Resistance (0.01 N NaCl, 1000 Hz)=290 ohms;
Calculated Resistivity=35.7 ohm/cm$^2$.

Each sample was equilibrated in 0.6 N KCl for 2 hours and the resistivity re-evaluated.

(a) Polypropylene Backed Membrane

Thickness=0.090 cm;
Measured Resistance (0.6 N KCl; 1000 Hz)=80 ohms;
Calculated Resitivity=9.8 ohm/cm$^2$.

(b) Dacron ® Backed Membrane

Thickness=0.041 cm;
Measured Resistance (0.6 N KCl; 1000 Hz)=62 ohms;
Calculated Resistivity=7.6 ohm/cm$^2$.

A sample of the batter used to dip coat the membranes was checked for cation exchange capacity which was found to be 1.29 meq/dgr.

DESCRIPTION OF HETEROGENEOUS CLOTH BACKED CATION EXCHANGE MEMBRANE FROM POLYELECTROLYTE AND POLYVINYLIDENE FLUORIDE

EXAMPLE X

Five grams of the polyelectrolyte prepared in Example V were admixed with 7.5 grams of polyvinylidene fluoride which resulted in a batter by stirring both into 50 ml of methyl ethyl ketone at 50° C. A piece of 5"×4" polytetrafluoroethylene (Teflon ®) cloth was dip coated in the batter, drip dried, oven dried, and water equilibrated for one hour. The cloth backed membrane was converted to the sodium form by one hour's equilibration in 2 N NaCl followed by complete rinsing out of imbibed salt by a prolonged water wash. This membrane was brown in color and passed and pressure dye test to prove it was pinhole free.

The resulting cation exchange membrane had the following properties:

Thickness=0.025 cm;
Measured Resistance (0.01 N NaCl; 1000 Hz)=280 ohms;
Calculated Resistivity=34.4 ohm/cm$^2$.

In 0.6 N KCl, a portion of the above membrane had the following properties:

Thickness=0.025 cm;
Measured Resistance (0.6 N KCl; 1000 Hz)=72 ohms;
Calculated Resistivity=8.8 ohm/cm$^2$.

The residual batter, on drying was measured for its cation exchange capacity which was 1.43 meq/dgr.

EXAMPLE XI

The same reaction materials and cloth backing were used as in Example X above except a change in the concentrations of materials to make up the batter were employed as follows:

3.0 g polyelectrolyte
2.0 g polyvinylidene fluoride
20 ml methyl ethyl ketone

Properties of the leak-free membrane produced were as follows:

Thickness = 0.026 cm;
Measured Resistance (0.01 N NaCl; 1000 Hz) = 62 ohms;
Calculated Resistivity = 7.6 ohm/cm$^2$.

After equilibration with 0.6 N KCl, the membrane had the following properties:

Thickness = 0.027 cm;
Measured Resistance (0.6 N KCl; 1000 Hz) = 26 ohms;
Calculated Resistivity = 3.2 ohm/cm$^2$.

The casting batter had a cation exchange capacity of 1.82 meq/dgr.

DEMONSTRATION OF INCREASED RESISTANCE TO OXIDATION BY HYPOCHLORITE SOLUTION

EXAMPLE XII

A 1"×1" strip of the unbacked cation exchange membrane prepared in Example VII was placed in 5% calcium hypochlorite at a pH of 4.0 at room temperature (21°-25° C.) over a 50-day period. After an initial increase in resistivity, the sample stablized and remained substantially constant over 1200 hours as shown below. This constancy is unique and totally unexpected for a hydrocarbon based polyelectrolyte and is demonstrated proof that the polyelectrolyte of this invention has indeed increased oxidation resistance to appreciable concentrations of hypochlorite.

| Time (hours) | Resistivity ohm-cm$^2$ (0.01N NaCl; 1000 Hz) |
|---|---|
| 0 | 11.7 (colored Brown) |
| 264 | 22.6 (colored White) |
| 432 | 27.1 (colored White) |
| 1032 | 35.0 (colored White) |
| 1200 | 33.4 (colored White) |

EXAMPLE XIII

A 4"×1" strip of the backed membrane prepared in Example X was subjected to the same solution and conditions of the prior Example XII for a period of 14 days. It did not show an appreciable increase in resistivity during this period as noted below.

| Time (hours) | Resistivity ohm-cm$^2$ (0.6N KCl; 1000 Hz |
|---|---|
| 0 | 8.8 |
| 168 | 9.8 |
| 336 | 9.3 |

The above examples show various embodiments of polyelectrolyte synthesis and membrane fabrication therefrom in accordance with the present invention resulting in a product having increased resistance to oxidation. It is to be understood that this invention is not to be limited to the specific embodiments except as defined in the appended claims.

The embodiments of this invention in which an exclusive property or privilege is claimed are defined as follows:

1. A method for producing a heterogeneous cation exchange membrane having increased resistance to oxidation comprising preparing a batter mixture of a sulfonated polyphenylene sulfide polyelectrolyte and a fluorocarbon polymeric film forming binder, said binder being dissolved in an appropriate solvent, forming a thin film from said batter mixture and allowing the said solvent to evaporate therefrom to form a solid substantially unfractured membrane.

2. The method of claim 1 wherein the weight of said polyelectrolyte in the batter mixture is between about 40-60% and the film forming binder is polyvinylfluoride.

3. The method of claim 1 therein the said thin film is formed by the said batter mixture being dip coated onto a cloth backing material.

4. The method of claim 1 wherein the said film is formed by directly casting said batter mixture without a backing material.

5. The method of claim 1 wherein the film forming binder is a polyfluorocarbon selected from the group consisting of the polymers of polyvinylidene fluoride, polytetrafluoroethylene, polyvinylfluoride, polychlorotrifluoroethylene, polytrifluorostyrene, polytrifluoroethyl sulfonyl fluoride, polytrifluoroethyl sulfonic acid, the copolymer of vinylidene fluoride-hexafluoropropylene, the copolymer of vinylidene fluoride-hexafluoropropylene, and perfluoroalkyl ether derivatives of the above listed polymers and mixtures thereof.

6. The method of claim 1 wherein the solvent for the said film forming binder is selected from the group consisting of methyl ethyl ketone, cyclohexanone, dimethyl formamide, dimethyl acetamide, hexamethyl phosphoramide, aliphatic ketones and mixtures thereof.

7. A heterogeneous cation exchange membrane comprising fine particles of a cross-linked, sulfonated polyphenylene sulfide polyelectrolyte dispersed essentially throughout a matrix of a thermoplastic fluorocarbon polymeric film forming binder.

8. The membrane of claim 7 wherein the polyelectrolyte comprise between about 10 to 70% by weight of said membrane.

* * * * *